United States Patent
Burgess

[19]

[11] Patent Number: 5,966,693
[45] Date of Patent: Oct. 12, 1999

[54] METHOD FOR COMBINING LOAN WITH KEY EMPLOYEE LIFE INSURANCE

[75] Inventor: Duane Burgess, Indianapolis, Ind.

[73] Assignee: Money Accumulation Programs, Inc., Indianapolis, Ind.

[21] Appl. No.: 08/643,966

[22] Filed: May 7, 1996

[51] Int. Cl.$^6$ .................................................. G06F 17/60
[52] U.S. Cl. .................................. 705/4; 705/38; 705/1; 707/104
[58] Field of Search .................................. 705/4, 35, 30, 705/38, 1; 707/104

[56] References Cited

U.S. PATENT DOCUMENTS

| | | | |
|---|---|---|---|
| 5,214,579 | 5/1993 | Wolfberg et al. | 364/408 |
| 5,231,571 | 7/1993 | D'Agostino | 364/408 |
| 5,429,506 | 7/1995 | Brophy et al. | 434/107 |

FOREIGN PATENT DOCUMENTS

| | | | |
|---|---|---|---|
| 3-065785 | 3/1991 | Japan | G07B 1/00 |

OTHER PUBLICATIONS

Bruce Givner and Mitchell Port, A New Sizzle for Split Dollar, Insurance Sales, v. 131, pp. 30–33, Sep. 1988.

*Primary Examiner*—Emanuel Todd Voeltz
*Assistant Examiner*—Raquel Alvarez
*Attorney, Agent, or Firm*—Eckert Seamans Cherin & Mellott, LLC

[57] ABSTRACT

A leveraged whole or universal life insurance plan is administered using a computer processing method to ensure lender security, accumulation of value to an employee, and minimum tax exposure. The employer borrows in installments to partly cover insurance premiums on a policy owned by the employee, and pays interest on the loan for the life of the plan. The employee also pays part of the premiums, and collaterally assigns the policy as security for repayment of the loan. As the insurance policy appreciates in value, premiums decrease. The employee can pay down the loan and eventually eliminate premium payments, or can borrow against the policy for tax-free retirement income. The excess of the death benefit over any loan principal remaining upon the death of the employee is a tax-free payment to the employee's beneficiaries. The computerized method includes storing parameters of insurance policies and loan agreements in a computer memory, over ranges of possible death benefits, cash values, loan principals, and incremental payments over a span of years. Employee factors are quantified and input to the computer processor, which is programmed to integrate the employee factors with the insurance and loan terms to select an integrated loan/insurance arrangement to schedule payments to meet maximum contributions and retirement and life expectancy expectations. The processor adjusts incremental payments from the employer and the employee to ensure sufficient collateral and to comply with tax regulations that are unfavorable to certain front-loaded payment schedules.

5 Claims, 3 Drawing Sheets

FIG. 1b

TERMINATION
FIG. 1d

FIG. 1a

OPERATION
FIG. 1c

METHOD FOR COMBINING LOAN WITH KEY EMPLOYEE LIFE INSURANCE

BACKGROUND OF THE INVENTION

1. Field of the Invention

The invention relates to a method for processing certain financial and demographic data to define complementary terms for several related agreements, including an employer/employee agreement, a life insurance policy and a third party loan secured by the policy, and in so doing to apply certain revenue rules regarding permissible premium payment proportions and payment timing for adjusting a schedule of payments. The invention provides a convenient means to arrive at a workable tax-minimized arrangement for key employees to accumulate value with the assistance of their employers.

2. Prior Art

Life insurance is useful as an investment or savings tool as well as for its basic object of providing a death benefit payment to a beneficiary. This is true because a whole life policy develops a cash value. The cash value can be borrowed against, and any loans that are outstanding at the time of death can be settled from the death benefit. Such insurance is distinct from term insurance, which does not develop a cash value and is characterized by increasing premium rates as the insured person ages.

An employer may find it appropriate to provide group life insurance to employees as a benefit. For example, an employer may provide group term life insurance on employees, financing the coverage itself or paying experience-rated rates. An employer providing such insurance, either alone or in conjunction with an insurance company, can at the same time provide term insurance naming the employees' beneficiaries, and also obtain insurance on the employees under policies naming the employer as beneficiary, to minimize the possibility of undue financial burden should an unusually large number of insured employees die over a short time. If the employer takes out whole life insurance (known as corporate-owned life insurance) in such an arrangement, the employer can borrow against the cash value, should the need arise.

In general, the death benefit of an insurance policy is not taxable to the beneficiaries or to the estate of the insured. Internal Revenue Code Section 79, which concerns term life insurance, imposes imputed income on an employee with respect to company-paid insurance over a stated maximum ($50,000). This section reduces the extent to which conventional insurance arrangements as above may shelter income from taxes. As explained in U.S. Pat. No. 5,429,506—Brophy et al., the disclosure of which is hereby incorporated, it may be desirable to combine a premium paying corporate life insurance plan with a voluntary employee group life plan. The premiums are split between the employer and the employee so as to provide a designated death benefit to the beneficiaries of the employee, while enabling the employer to invest funds in the cash value of the life insurance contract so as to help fund the group life benefits. As explained in the Brophy patent, there are a number of problems with attempts to make life insurance into a workable employee benefit plan having a cash value for the employee, while avoiding unnecessary taxation of either the employer or employee, as well as undue risk for the employer.

There are various investment and savings techniques, including life insurance, and the different techniques carry different tax implications. In a "split dollar" insurance plan, payments are made by both the employer and by the employee. Payments by the employer are tax deductible business expenses, but payments by the employee must be made from after-tax income. The death benefit is not taxable under the present Internal Revenue Code. The employee's contribution effectively is taxed because it comes from after-tax income, and as such resembles a savings plan without tax liability as to appreciation (i.e., if the difference between the death benefit and the amounts paid in is positive).

Comparing the tax consequences of various investment vehicles, there is no savings, investment and/or insurance technique that avoids taxation with respect to each of a contributing employer, employee and beneficiary. Investments in commodities that may appreciate, for example interest bearing accounts, mutual funds and the like, all are made from after-tax income. Appreciation income on liquidation of such investments is taxable (except perhaps in the case of municipal bonds). Qualified retirement plans, 401(k) plans and individual retirement accounts accumulate untaxed income, but taxes are simply deferred. The accumulated value is taxable at the taxpayer's tax rate when money is taken out of the tax deferred account. In addition there are limits on the amount of income that can be accumulated in tax-deferred accounts. The employer also may be required to make the plan available equally to all employees in order for the plan to qualify for tax-deferred treatment. Thus, such accounts cannot be used as a means to compensate key employees.

Term life policies are characterized by increasingly higher premium rates as the insured ages. Whole life policies, on the other hand, normally have constant premiums but the premiums are substantially higher than term insurance premiums. During the life of the insured, the premiums paid in are invested by the insurance company. Income on paid-in premiums covers part of the death benefits payable, and also enable the insurance company to obtain a profit.

The cash value of a whole life policy increases with aging of the insured, and can be borrowed against. Conversely, it is possible to borrow money for use as payment of an insurance premium. It would appear that borrowing to pay insurance premiums would be financially quite unfavorable for the insured. The insured would need to encumber collateral to secure the loan, and would incur interest charges on the loan. At least the principal payments on the loan would be from after tax income. Such an arrangement would appear beneficial only to insurance companies in that additional policies could be sold. Insurance companies have attempted to market insurance products comprising a loan by the insurance company to the insured of at least a portion of the premiums payable on a policy, with the cash value of the policy and the death benefit providing collateral for the loan. Due to interest on the loan premium and payments from after-tax income, this "leveraged" insurance can be expected to have a poor overall rate of return when all factors are considered.

In any life insurance arrangement, the insurer calculates the appropriate premium payment as a function of mortality rates and the expected return on investments made with premiums paid in by all its insured persons, so that claims can be paid while earning a profit. In some plans the insured pays in more than the premium thus calculated, and the return on the investment of the excess (e.g., as interest) defrays part of the premium that would otherwise be payable. When an insurance policy is fully paid up such that the return on the insurer's investment of paid-in amounts covers all further premiums, the policy resembles a purchased annuity, a certificate of deposit or an interest bearing account.

There are Internal Revenue Service limits on the extent to which premiums can be borrowed or paid in early so as to enable investment of the premiums to provide a return, while retaining the favorable tax treatment of a life insurance death benefit. Over the first seven years of a policy, for example, at least four parts in seven of premiums due must be paid in rather than borrowed. Internal Revenue Service and court rulings also distinguish an insurance policy from a modified endowment contract or an annuity. To be considered an insurance policy, less than 73% of the premiums due can be paid in over the first four years. Rules and regulations also define the permissible net single premium (NSP), guideline level premium (GLP) and guideline single premium (GSP). Failure to comply with such regulations, promulgated under DEFRA or TAMARA, can cause an ostensible insurance policy to be treated as a taxable investment, or may change the order in which payments made or withdrawn are deductible. For example under TAMARA, proceeds of the policy can be considered taxable income first, and deductible basis last, changing from a first-in-first-out taxation order to a last-in-first-out order.

The DEFRA and TAMARA guidelines and similar regulations need to be observed to retain favorable tax treatment, but the rules are normally applied retrospectively. For example, the proportions of payments made are considered when the IRS conducts an audit or when an accountant assesses taxes that are due on activity during the previous year.

Various inter-related factors are involved in considering the possibility of borrowing to pay insurance premiums. These include at least: the rate of interest payable on any loan taken out to pay premiums; the cash value at any given time and the amount of the death benefit (which will provide collateral for the loan); employee borrowing against the insurance policy; the proportion of premiums borrowed vs. the proportion paid-in, as well as the timing when particular amounts are to be paid; the proportion applied from after-tax income (by an employee) vs. deducted as a business expense (by an employer); the return on insurance company investment of paid-in contributions to meet scheduled premiums as provided by the terms of the insurance policy and the effect of unscheduled premiums (i.e., prepaid premiums); the employee's tax rate; and, the legal rules and limitations designed to exclude endowments from favorable tax treatment.

All these factors vary with the circumstances. What is needed, and provided according to the present invention, is a data processing method that provides a practical insurance and investment product that meets the definitions of a proper insurance contract so as to qualify for favorable tax treatment, while ensuring that the investment of each of the parties is protected and not subject to undue risk. The object is to dovetail the terms of an insurance contract, a loan agreement and an employer/employee agreement, such that premiums are paid partly by the employer and partly by the employee, including via borrowed money, to provide for premium payments, to comply with IRS regulations and favorable tax treatment, and to permit the employee to accumulate value over a working career.

The method is accomplished by storing in a file a set of constants that characterize the terms of at least one and potentially several alternative available life insurance contracts and loan agreements, which can be the offerings of different companies. Variables are then stored in a second file to characterize the situation of one or more particular employees, including each employee's tax rate, and including insurance related information such as age and potentially also health status information (e.g., smoking or nonsmoking). Also stored in the variables file are an amount that an employer is willing to contribute, or a desired cash or death benefit value to the employee, or both. The terms of a loan to pay premiums on the insurance policy then are calculated so as to include unscheduled (prepaid) premiums sufficient to have the policy fully paid within a predetermined time period. A set of limiting rules are then applied and a division of payments is made between the employer and employee to result in a payment schedule. The calculations and limiting rules ensure compliance with the tax codes and ensure that the value of the policy will provide sufficient collateral to cover the loan through the term of the agreement. Complementary terms of agreement are thereby defined between or among the employer, the employee, the lender and the insurer. In this manner, an insurance policy can provide a vehicle for accumulating value in a tax-minimized, safe and legal manner.

SUMMARY OF THE INVENTION

It is an object of the invention to automate the selection of an optimized collection of related terms of a combined insurance, loan and employment arrangement, legally to avoid unnecessary taxation while permitting the transfer of value from an employer to an employee.

It is a further object of the invention to define a series of constant factors and a series of variable factors relating to an employee, an employer, an insurance contract and a loan; to provide a series of method steps whereby the factors are applied together with legal constraints and limits on the amounts and timing of contributions from the employer and the employee; and to produce a leveraged split dollar insurance plan having a predetermined term of years, with minimal tax exposure, and in compliance with present Internal Revenue rules.

These and other objects are accomplished by a computerized method to administer leveraged split dollar whole or universal life insurance coverage. The method selects a schedule of incremental loan and premium payment figures, to ensure lender security, to provide an accumulation of value to the employee, and to minimize tax exposure.

In general, the employer enters a loan agreement to partly cover employee insurance premiums and agrees to pay interest on the loan for the life of the plan. The employee takes out and owns the life insurance policy, paying the remainder of the premiums from after-tax income. The employee's contribution from after-tax income for his or her share of the premiums determines the employee's maximum necessary tax exposure under the plan, because the employer's contribution is deductible by the employer, and the ultimate proceeds of the policy are untaxable death benefits. It is also possible to schedule payments from the employer as bonuses to the employee, which may also be taxable to the employee.

The employee agrees collaterally to assign the policy as security for the principal due on the loan taken by the employer. As the policy value accumulates over time andthe cash value of the policy increases, premiums decrease as appreciation of the policy offsets premiums due. The employee can pay down the loan, or alternatively can borrow money on the policy for retirement income or the like. At least by the end of a planned term of years, or upon the death or termination of the employee, the employer's loan is repaid.

The computerized method includes storing the parameters of one or more available insurance agreements in a computer memory to define a policy to be supported over an agreement term of at least seven years during which premium installments are payable, and storing the parameters of one or more available loan agreements in the memory. In particular, successive loans are planned to meet the insurance premium installments. The stored parameters of the insurance and loan agreements encompass ranges of possible death benefits, cash values, loan principals, corresponding payments and terms of years.

Quantitative factors defining a particular employee then are input to the computer processor. The processor is programmed to integrate the employee factors with the insurance and loan terms, for selecting a particular schedule of loans and premium payments. Factors are included such as desired contribution levels of the employee and the employer, employee age and retirement expectations, etc. The processor calculates corresponding insurance and loan terms over time, so that the insurance policy and the loan agreement are both supported. The processor then adjusts the contribution levels of the employer and the employee to arrive at actual payments to ensure sufficient collateral and compliance with tax regulations.

Factors defining the employee include age upon commencement of the plan and expected retirement age, desired plan duration, maximum acceptable contribution amount and desired policy value. A number of these factors are interrelated and some can be determined by calculations using the other factors. Qualitative factors such as the employee's health status apart from age and statistical life expectancy may also be pertinent to the insurance agreement, such as whether or not the employee is a tobacco user.

The processor selects or accepts input setting a policy value and plan duration, and determines from these factors the incremental premium required to support a policy in that amount over the chosen term of the plan. The processor then subdivides the premiums over at least the first seven years, to determine scheduled premiums payable by the employee, unscheduled premiums payable by the employer at least in part from amounts obtained under the loan agreement, and applies the DEFRA and TAMARA guidelines and limits for the guideline level premium, guideline single premium, net single premium and rules of taxation of modified endowment contracts.

In at least a first three years of the term of years the employer payments include employer unscheduled premiums, and over the term of years the actual employer payments include all the employer unscheduled premiums plus interest on the loan agreement. No more than seventy percent of the sum of all scheduled and unscheduled premiums to be paid under the insurance agreement are paid during a first four years of the term of years from said scheduled and unscheduled premiums, such that the plan avoids unfavorable tax treatment as a modified endowment. After seven years of the term of years, the employee may terminate actual payments and use loans on the insurance policy to pay all or part of the scheduled premiums payable by the employee. However, such loans likewise require collateral, and by collateral assignment of the insurance policy as security for the loan taken by the employer, the employee may only borrow on the policy up to an amount that leaves a cash value and/or encumbered death benefit sufficient to offset the remaining principal due under the loan agreement. In any event, the actual employer and employee payments support a split dollar insurance policy owned by the employee and providing a tax-free death benefit to beneficiaries of the insurance policy equal to a difference between the death benefit and the loans on the insurance policy taken out by the employee.

The combined loan agreement and insurance policy plan can be integrated with the employee's retirement program. This is accomplished by adjusting the employer and employee contributions such that loans on the insurance policy by the employee are in part used for retirement income to the employee, thereby reducing the difference between the death benefit and the loans on the insurance policy.

The quantitative factors affecting the particular computation of amounts, preferably include the age of the employee, a planned retirement age, a planned retirement duration, a minimum number of years for payment of scheduled premiums, a maximum incremental payment, an employee tax bracket, and at least one health factor affecting statistical longevity, such as whether the employee is a smoker.

The plan according to the invention minimizes but does not eliminate tax consequences to the employee. Inasmuch as IRS rules prohibit using borrowed money for four or more of the initial term of seven years (or a 4/7 proportion of the total paid during that seven years), a portion of the premiums are obtained from the employee's after-tax assets. Part of these employee payments can be paid as bonuses to the employer, to supply taxable income to offset the premiums. On the employer side, however, as much as 96 to 98% of the cost of the plan is a tax deductible business expense.

Additional aspects of the invention will become apparent in connection with the following discussion of nonlimiting examples, and specific applications of the plan to exemplary employee conditions.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

The plan of the invention generally involves a computerized method for integrating an employer/employee agreement together with loan and life insurance policy agreements, and calculating and coordinating the values of certain monetary transfers set into the agreements, in order to generate a financial plan that optimally exploits the appreciation and favorable tax treatment of life insurance policies, and the availability of capital from secured loans. A set of agreements on coordinated terms among several parties are determined from parameters of available insurance and loan agreements. Factors defining the employee are applied to the parameters of the two agreements, to enable a transfer of value in general from an employer to an employee, while minimizing the tax consequences of the plan to the employer and employee. The result is a transfer that is up to 98% tax deductible as to contributions of the employer, and up to 50% tax deductible as to contributions of the employee.

The plan leverages the life insurance policy by providing for borrowed money to pay insurance premiums, via a loan agreement secured by the insurance policy. The premiums required to support an insurance policy of a desired face value do not directly define the amount of the loan agreement, and instead according to the invention, calculations are made to enable a practical plan of contributions while complying with or gaining the benefit of standing tax rules, regulations and procedures regarding the permissible levels of contribution from loans and the timing of insurance premium payment. Thus the process of the invention takes into account the taxation consequences of particular payment schedules, policy value buildup, payout/liquidation procedures and taxation consequences upon withdrawal of value from the plan, and application of the tax free insurance policy death benefit.

Figure 1A:
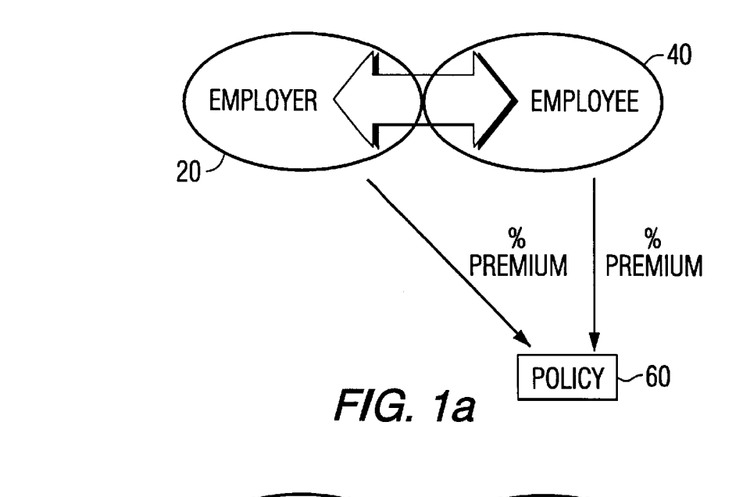
FIGS. 1a through 1d are schematic flow diagrams illustrating the flow of value according to the plan of the invention, in chronological order at different times showing operation and conclusion of the plan to be automatically generated by the process of the invention.

FIGS. 1a through 1d illustrate generally the flow of value according to the plan. In FIG. 1a, the large double arrow represents the exchange of services by an employee 40 for remuneration by the employer 20. The basic object of the plan is that in consideration of the value of the employee's services for the employer (especially for a key employee), the employer desires to assist the employee in accumulating assets at a rate greater than the employee could afford to do alone. More specifically, employer 20 is to help employee 40 to purchase an insurance policy 60 of a larger face value than the employee could otherwise afford. To accomplish this, the employer contributes to the payment of the premium on the larger policy 60. The basic configuration of FIG. 1a could result if the employer simply increased the salary, bonuses or other remuneration paid to compensate the employee, which additional money the employee could apply to the purchase of insurance. Such compensation would be deductible by the employer, but taxable to the employee at a rate characteristic of the employee's tax bracket. Moreover, such an increase could place the employee in a higher tax bracket than before. An arrangement where an employer pays a portion of premiums of an insurance policy, known as a split dollar arrangement, is provided whereby part of the premiums needed to support a policy owned by the employer are from employer payments and part are from employee payments. Although substantially equivalent to the employee paying premiums from after-tax earnings, a split dollar plan has certain tax advantages, provided the policy is owned by the employee.

Figure 1B:
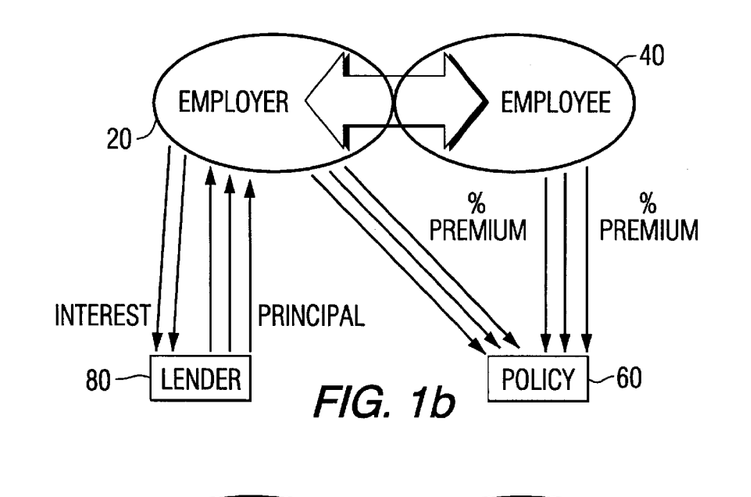

As shown in FIG. 1b, according to the plan of the invention, employer 20 borrows a principal amount from a lender 80, uses the borrowed sum to pay a portion of premiums on policy 60, the remainder of the policy premium being due from employee 40. According to this arrangement, over the term of the plan, employer 20 need only pay the interest on the loan taken to offset its portion of the insurance policy premiums. The cash value and/or death benefit of insurance policy 60 supply collateral to secure the loan. Over time, the accumulation of value in policy 60 exceeds the amount of the loan, which can paid off at the end of a predetermined time period, or settled from the death benefit on the policy in the event of the employee's death.

Insofar as the cash value of policy 60 exceeds the principal due on the loan at any point before the loan is paid, the money is also available as collateral for additional loans to be taken out by the employee. Such loans can be employed either for purpose of providing income to the employee (which income is not taxable), or for offsetting the employee's contribution to ongoing premiums (likewise from sums that are borrowed and not taxable). According to the invention, all these transfers of value are coordinated to minimize tax exposure in the long run.

The employer, employee, lender and insurance company are all separate entities operating at arm's length. The employee applies for and is the owner of the life insurance policy in his own name. The terms of the policy have conventional premium rates, rates of return and the like, which depend on the employee's age, the desired size of the policy (i.e., the amount of the death benefit), etc. The employer and the employee each have limited assets to pay premiums, so the policy is to be chosen of a sufficient size to be supported by the combined payments that the employer and the employee are willing to make. The premium paid by the employee may be from his own assets, or may be a bonus from the employer or double bonus, etc. These employee contributions to the premium are from after-tax income, and are referred to as the scheduled premium.

Figure 1C:
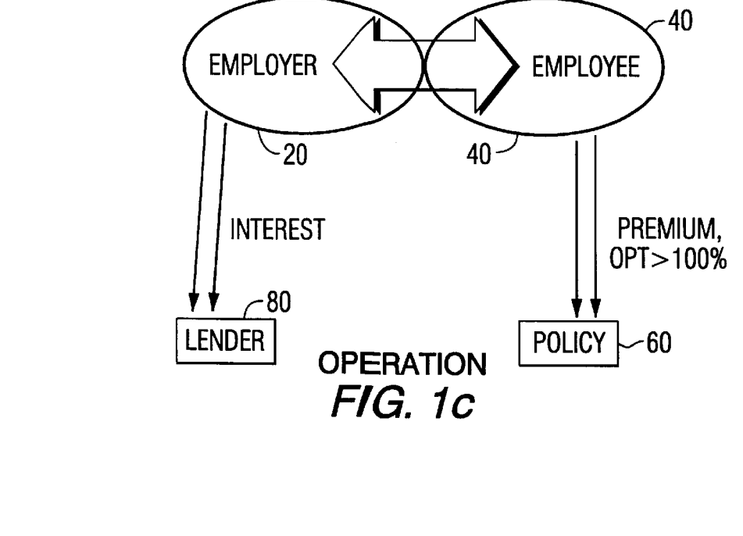
Figure 1D:
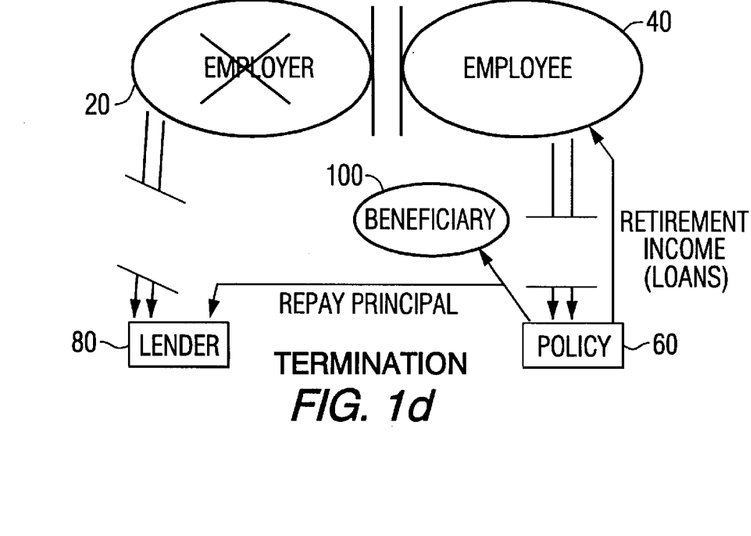

The premium payable by the employer is in two parts, and is referred to as the unscheduled premium. Part one of the employer-payable premium to the employee-owned policy is borrowed from lender 80. By collateral assignment of the insurance policy, the employee agrees to return the borrowed money to the employer (or more accurately to the lender) upon termination of the plan. The policy is pledged as security for the loan. The employer agrees to pay all interest on the loan until termination of the plan and retirement of the debt to lender 80. Part two of the employer-payable unscheduled premium is an on-going payment of premiums to the insurance policy covered by the assignment, also secured by the policy, which is not borrowed. This amount is also returned to the employer upon termination of the plan. FIG. 1c shows that during operation of the plan, the employer pays substantially only interest on the loan to lender 80, and the employee pays an ongoing premium amount on the policy 60. FIG. 1c shows alternatives that occur upon termination of the plan, when policy 60 or loans on policy 60 repay the principal on the loan, taking employer 20 out of the arrangement. The remainder of the policy passes to the employee's beneficiaries 100 in the event of death, or if the employee has simply terminated employment, this remainder is available to the employee, for example for retirement income from loan taken from lender 80 or others, and secured by policy 60.

Figure 2:
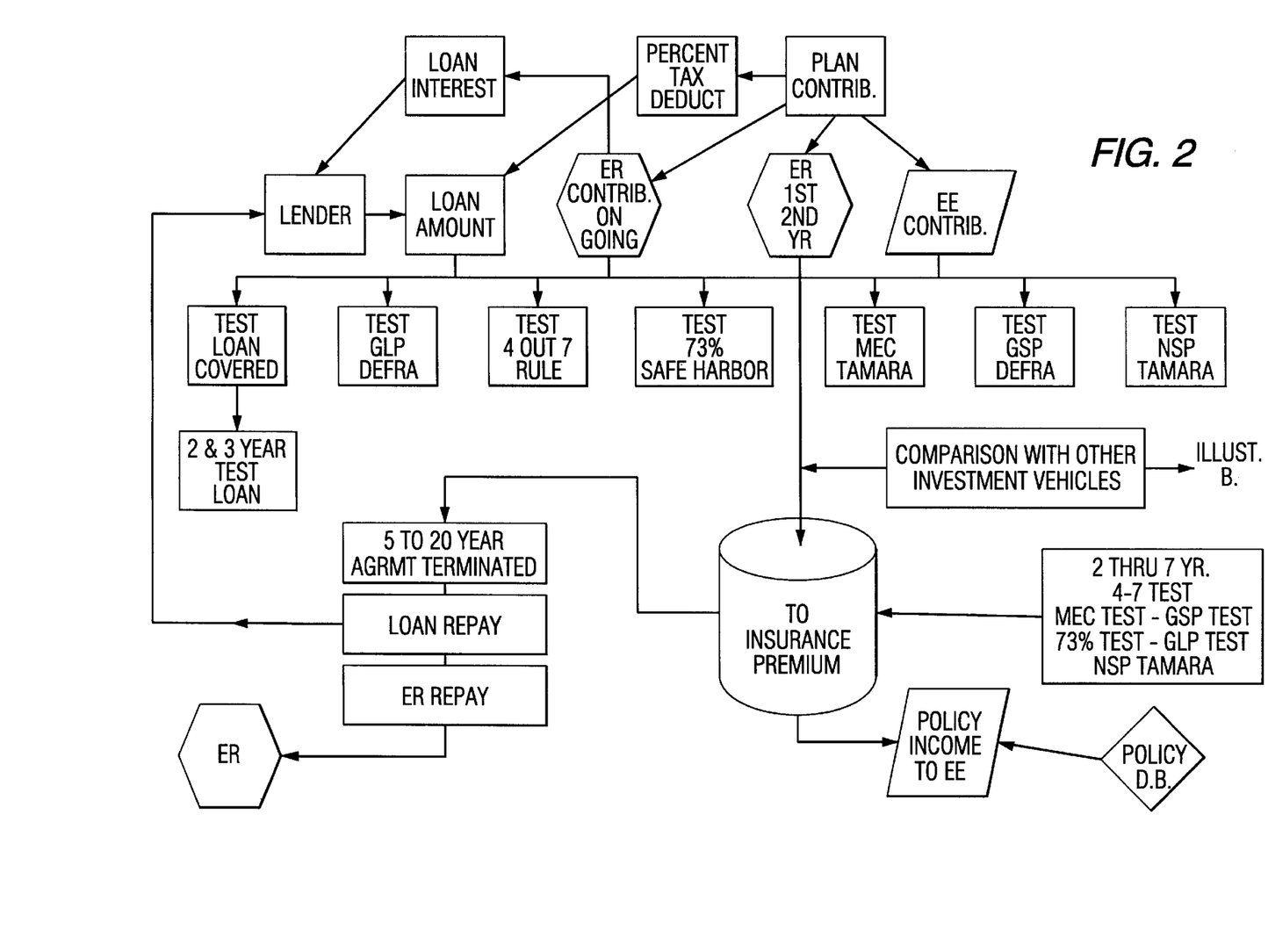
FIG. 2 is a block diagram representing data file interrelationships, information flow and value transfer routes of the plan according to an embodiment of the invention.

An object of the invention is to determine the respective amounts (proportions and timing) of the scheduled (employee) premiums and the borrowed and unborrowed unscheduled (employer) premiums, so as to comply with the tax regulations respecting favorable treatment of life insurance policies and to accumulate value that will inure to the benefit of the employee or his beneficiaries. As shown in FIG. 2, the employer's contribution is subdivided into an employer ("ER") contribution early in the plan, preferably in the first and second year, and an employer ongoing contribution, substantially devoted to the loan interest. The employee ("EE") contribution is ongoing.

Several tax code regulations apply and are used according to the invention to set the proportions payable by the employer and employee, and when the employer contributions (especially the early contributions) can be made. According to certain tax rules, an insurance policy is construed as a modified endowment contract or single premium policy rather than a conventional insurance policy if too high a proportion of the premiums are paid initially, or if too high a proportion is funded by borrowed money. Nevertheless, it is an aspect of the plan that initial premium payments are made by the employer, with borrowed money. No more than 73% of the sum of scheduled and unscheduled premiums can be paid during the first four years of a policy, and no more than three of the first seven years of premiums (assuming equal premiums) can be borrowed. Other similar rules are applied as well, including DEFRA and TAMARA regulations defining applicable guideline level premiums, guideline single premiums and net single premiums. The total policy premiums are calculated to adhere to the regulations while scheduling large but permissible premium payments in the first years (especially the first three of seven years) from loans. Thus the payments are allocated and scheduled to meet the proportions and timing of contributions needed to comply with the regulations.

To meet the 4-of-7 rule, the plan cannot be terminated before 7 years, but the plan can have a payments term of at least five years and up to 20 years, during or after which term the loans taken by the employer to pay premiums and secured by collateral assignment of the policy, are to be retired. Preferably, the employer premiums from the loan are divided into three equal parts, payable over the first three years. To comply with the 73% rule, the sum of scheduled (employee) and unscheduled (employer) premiums are set slightly below the limit, for example at 70% of the sum of premiums to be paid under the policy during the first seven years, and are paid over the first four years. These limitations, factored together with the desired maximum contribution levels of the employer and employee, provide concurrent equations from which the processor generates a list of specific payments by the employer and the employee. Most of the employer payments can be funded from the third party loan. No other premium payments can be borrowed (i.e., by the employee), at the risk of unfavorable tax consequences.

The foregoing limitations under the initial years of the policy are intended to provide a safe haven for treatment of the plan as an employee owned leveraged insurance contract. It would be possible for the employee to own the insurance contract in this manner without paying off the employer loan, for so long as the employer continues to pay the interest. However, the assignment of the policy to offset the principal would decrease the amount available to the employee's beneficiaries as a death benefit, and would prevent the accumulation of value (against which the employee may borrow), which is the object of the plan. Therefore, employee scheduled premiums under the plan are calculated and scheduled to retire the loan over or at the end of a predetermined term of years such as 20 years, and the term determines the annual premium payable by the employee.

The premiums paid into the policy produce an income to the employee, measured by the economic benefit or appreciation of the cash value of the policy in excess of premium payments. This is calculated using PS-58 or the insurer term rates. Such income offsets a portion of the premium payable into the policy by the employee. Other things being equal, either the amount of the premium can be reduced over time in view of appreciation, or the policy face value can be increased accordingly.

After the first three years (FIG. 1c) and before termination (FIG. 1d), the employer continues to pay annual tax deductible interest payments on the loan taken out for the original premium payments. The employer preferably also makes planned small (2 or 4%) premium payments into the policy.

The employer at least pays the interest annually billed on the loan, which is a deductible expense to the employer in the year paid, but not for more than 12 months in advance.

The employee likewise continues to make annual payments to the policy. This continues for the term of the plan, which as noted above is 5 to 20 years, as predetermined when originally designing the plan and calculating the respective payments. After the nominal 5 to 20 year term, the employer and the employee both may stop payments. Alternatively, the plan can be arranged so that at the end of the nominal term, the payments continue for a further term as preselected, whereupon the death benefit and cash value of the policy are built further.

The plan is terminated and settled upon (1) death of the insured employee; (2) voluntary termination of the plan at the end of the nominal term; (3) involuntary termination of the plan through non-compliance by the employer (to pay interest) or the employee (to pay premiums); or (4) termination of employment by the employee or employer. In the event the plan is terminated before the end of the seventh year, no money can be withdrawn or loaned until the end of the seventh year without risk of adverse tax consequences.

Figure 3:
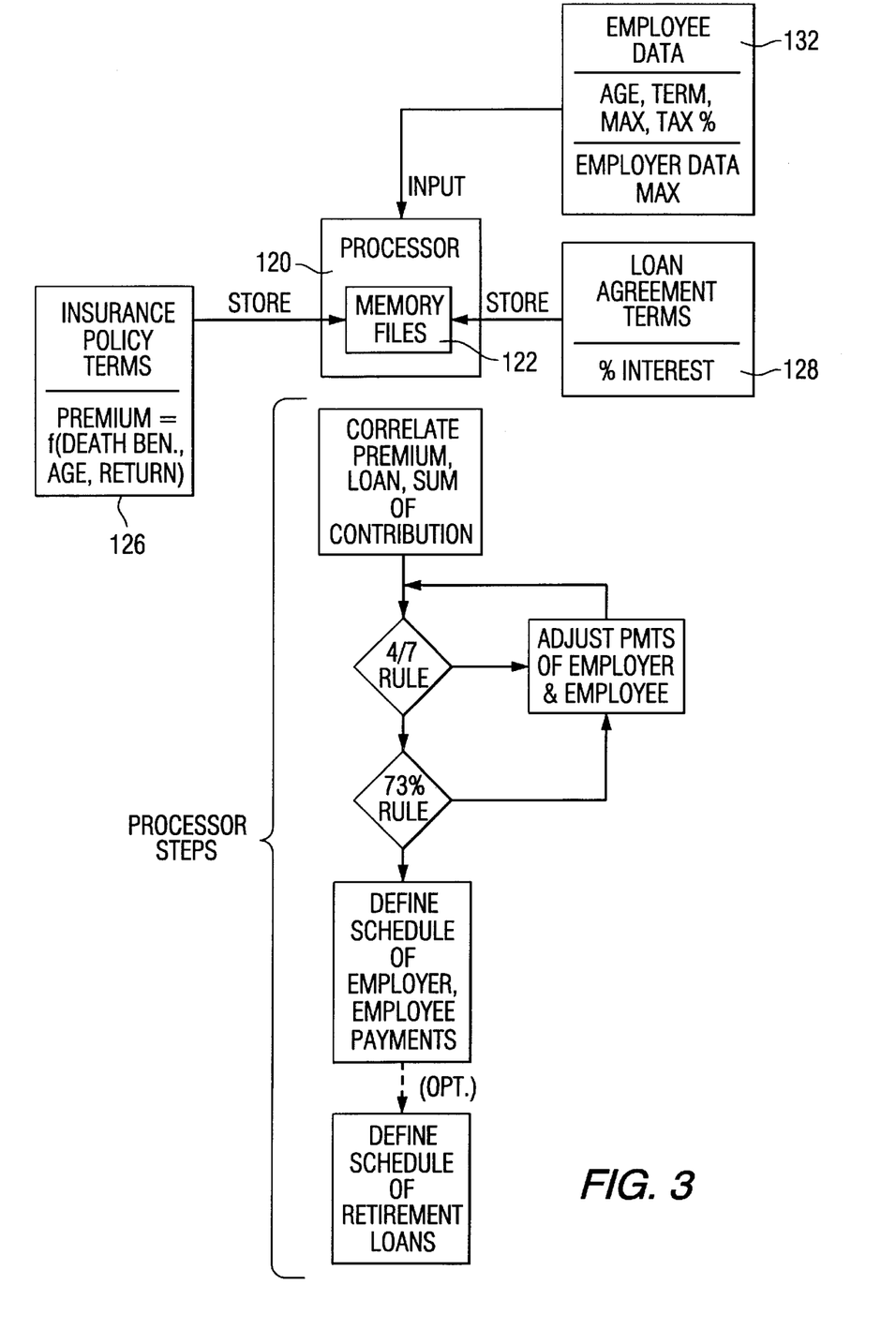
FIG. 3 is a block diagram illustrating the processor elements, memory files and processing steps according to an embodiment of the invention.

FIG. 2 schematically connects the elements of the plan according to the flow of value. FIG. 3 shows the information files needed and the steps undertaken by a computer processor 120 to effect the plan by integrating an insurance policy and a loan agreement (and/or choosing among a plurality of alternative policies and agreements) and integrating the particular amounts. Referring to FIG. 3, a first step is defining terms 126 representing at least one available insurance agreement for a life insurance policy to be owned by the employee. The insurance agreement is defined by storing data representing the terms 126 of the insurance agreement in a memory 122 of the computer processor 120.

In general, the policy terms include a particular incremental premium payment applicable for a person of given characteristics such as age and health status, to purchase a whole life or universal insurance policy having a given death benefit. The total premium can be subdivided into installments over time, which may be equal in each year of a predetermined term or may vary from year to year, in order to purchase the insurance policy. The employer and employee desire or can afford to support an insurance policy at a specific level of incremental payments, namely with a larger policy being available upon payment of larger premiums, and vice versa, according to a formula that at its simplest provides a proportional relationship between the premium and the amount of death benefit. Assuming that the policy is purchased over a given number of years, the relationship of the paid-in premiums and the death benefit or risk to the insurer in any one year, is met by the insurer by investing the paid-in premiums such that the available fund to pay death benefits increases over time until needed. As a result, by completing purchase of the policy in a certain number of years, the death benefit and cash value of the policy are ensured, and no further premium payments are necessary.

In any event, the stored terms defining the insurance agreement include a relationship of premium payments due in order to purchase life insurance over a predetermined term of at least seven years, in a range of values encompassing at least one of a predetermined death benefit range, a predetermined cash value range, and a predetermined premium payment range. A particular level and schedule of premium payments to be made can then be selected to provide a resulting death benefit—cash value figure, or in reverse order, selecting a desired death benefit—cash value figure will produce a resulting premium payment needed.

At least one available loan agreement is also defined, the loan to be taken by the employer. As with the policy, the loan agreement terms 128 are defined in data and stored to represent the terms of the loan agreement in the memory 122 of computer 120. The terms of the loan agreement include a relationship between principal and interest payments needed to pay off the principal. Preferably, loans to the employer are incremental during the initial years, and the loan terms 128 are to be used to choose predetermined principal amounts borrowed over the set term of years, and corresponding interest payments over the same term for the applicable balance of principal. The loan agreement terms 128 permit choice of a principal amount within a loan principal range. As with the insurance policy, the loan agreement is defined substantially as a proportion, namely the interest rate payable on the principal.

According to the plan the life insurance will at all times have a cash value sufficient to pay off the outstanding principal of loans taken to meet premiums. As a part of the combined insurance/loan and employer-employee agreement package, the insurance policy will be collaterally assigned to the employer to pay off the outstanding loan principal if the employee dies or employment is terminated. Other assets of the employee and the employer need not be encumbered, and the financial institution making the loan is fully secured.

The terms of the insurance agreement and of the loan agreement form a set of constants stored in computer memory 122, defining insurance policies and loans over ranges of death benefits, cash values, loan principals and terms of years, and in which the policy cash value range and the loan principal range overlap. The computer processor 120 accepts input employee and employer data 132 for at least one employee to participate in the plan. The employee data defines quantitative factors characterizing the employee's situation. Preferably, two or more such factors are chosen from: a desired death benefit amount, a desired contribution level of the employer and a desired contribution level of the employee, and preferably additional factors are input as conventionally applicable in the purchase and sale of life insurance, such as the employee's age and any information relating to expected longevity (e.g., smoker or non-smoker, family history, fitness information such as blood pressure, cholesterol level, etc.).

Referring to the processor steps in FIG. 3, the processor or computerized data processing means 120 applies input data 132 to the insurance agreement terms and loan agreement terms stored in memory 122, to determine necessary premium payments, and to equate a sum of yet-to-be-determined contributions or payments of the employer and the employee with a particular loan principal such that the sum of contribution levels of the employer and employee is sufficient to offset the principal and interest payments of the loan agreement, and the amount of the insurance premiums.

The processor is programmed to then adjust or subdivide the sum of employer/employee payments to meet standing rules for the maximum proportion of borrowed money to pay premiums (4/7) and the maximum portion of premiums that can be paid in the first three years (73%). Additionally, the DEFRA and TAMARA guidelines are applied to ensure compliance with the guideline level premium, guideline single premium and net single premium limits, namely by reducing or rescheduling for a later time any sums otherwise calculated in excess of the limits. The rules provide concurrent equations that determine the amount of premium payments that must be met by employee payments as opposed to employer payments, and constrain the extent to which premiums can be borrowed or paid in early in the initial 7 years.

A schedule of incremental employer payments and employee payments over time are thereby automatically generated, determining the incremental loan principal amounts to be borrowed and determining the interest payment needed. A division of payments between sums borrowed by the employer (and secured by the policy), and sums payable by the employee from after-tax income, is made as a part of the process in order to comply with the above-described limitations that apply due to tax regulations.

The data processing means adjusts the contribution levels of the employer and the employee to provide actual employer payments and employee payments. The actual employee payments, termed "scheduled premiums" in this disclosure, are determined in calculated amounts payable for at least five years, and preferably between 7 and 20 years. In at least a first three years of the term of at least seven years, the actual employer payments include so-called unscheduled premiums together with all interest on the loan agreement. The payments are then subdivided such that no more than seventy three percent, and preferably no more the seventy percent (for a safety margin) of the sum of all scheduled and unscheduled premiums to be paid under the insurance agreement are paid during the first four years of the term of years from said scheduled and unscheduled premiums, and over the first seven years, no more than four of the seven annual premium payment (or a proportionately equal number) are made using money borrowed either by the employer or the employee. These rules represent the limits under which the leveraged insurance arrangement can be regarded as favorably treated life insurance instead of a modified annuity or the like, under the present tax laws.

The following Table I shows an example output of the processor obtained according to a typical insurance policy having a nominal million dollar death benefit (which actually can be variable depending on economic returns on investment according to the terms of the policy), over the initial 7 years.

TABLE I

SEVEN YEAR FUNDING TERM

| Year | Loan Amount | Employee Scheduled Premium | Employer Unscheduled Premium | Policy Premium |
|---|---|---|---|---|
| 1 | $34,386 | $14,700 | $7,033 | $56,119 |
| 2 | 34,386 | 14,700 | 3,767 | 52,853 |
| 3 | 34,386 | 14,700 | 500 | 49,586 |
| 4 |  | 14,700 | 500 | 15,200 |
| 5 |  | 24,006 | 817 | 24,823 |
| 6 |  | 24,006 | 817 | 24,823 |
| 7 |  | 24,006 | 817 | 24,823 |

The plan can be arranged to fully fund the insurance policy in as few as five years; however the annual employee premiums in the foregoing example over five years require employee and employer payments to complete funding in the fifth year of $72,018 and $2,450, respectively. In addition, the four-of-seven rule prohibits borrowing against the policy until the minimum seven year term elapses. Therefore, employees will normally prefer funding over 7 to 20 years, in which case the employee and employer premiums range from $24,006 and $817 in the example of Table I, to $14,700 and $500 for funding over 9 to 20 year terms of years.

In the example shown in Table I, a further payment that should be considered is the interest payable by the employer on the loan taken to pay the employer's borrowed portion of the premium during the first three years. The employer loan is in three equal annual installments, such that the interest payments due from the employer are $3,267, $6,533 and $9,800 during the first through third years (i.e., increasing with the additional principal each year). From the third year until retirement of the loan (assuming it is not paid down earlier by the employee), the principal is constant, as is the employer interest payment, namely $9,800. Thus, over the first five years, the total annual cost allotted to the employer, deductible as a business expense, is $10,300 annually for 4 years and then $10,617 annually until the loan is retired or paid down.

Assuming a key employee 45 years of age in an income tax bracket of 40%, who intends to retire at age 65, pre-tax annual contributions of $25,000 and after-tax contribution of $15,000, assuming an interest rate of 6.75%, will accumulate a cash value of $873,156 in the insurance policy upon retirement, or a net income of $61,250 per year. The employee may terminate actual payments and use loans on the insurance policy to pay all or part of the scheduled premiums after the initial seven years, or take loans against the policy to obtain income, especially for retirement income. Such loans reduce the net value because the policy would be pledged as collateral and proceeds of the policy would pay off the loans upon the death of the insured. Nevertheless, the actual employer and employee payments are sufficient to support a split dollar insurance policy owned by the employee and providing a tax-free death benefit to beneficiaries of the insurance policy equal to a difference between the death benefit and the loans on the insurance policy taken out by the employee.

Using the computer processor according to the invention and projections of economic factors in the future, the integrated insurance policy and loan agreement of the invention can be used further to plan an employee's retirement income. Table II illustrates such a plan wherein the 45 year old employee, from the plan of scheduled and unscheduled premiums over a twenty year term during which average interest rates (and return on insurer investment) is 6.5%, can pay off the remaining loan principal and retire upon reaching age 65 and over the next twenty years receive an income of $61,250 by borrowing against the policy and still retain a death benefit of $283,311 at age 85.

TABLE II

NET VALUES AFFECTED BY LOAN ACTIVITY

| Age | Annual Outlay | Accum. Loans | Accum. Value | Death Benefit Available |
| --- | --- | --- | --- | --- |
| 45 | $56,119 | $0 | $53,087 | $1,310,309 |
| 46 | 52,853 | 0 | 106,256 | 1,363,478 |
| 47 | 49,586 | 0 | 159,701 | 1,363,478 |
| 48 | 15,200 | 0 | 181,443 | 1,363,478 |
| 49 | 15,200 | 0 | 204,618 | 1,363,478 |
| 50 | 15,200 | 0 | 229,198 | 1,363,478 |
| 51 | 15,200 | 0 | 255,463 | 1,363,478 |
| 52 | 15,200 | 0 | 283,527 | 1,363,478 |
| 53 | 15,200 | 0 | 313,513 | 1,363,478 |
| 54 | 15,200 | 0 | 345,570 | 1,363,478 |
| 55 | 15,200 | 0 | 381,539 | 1,363,478 |
| 56 | 15,200 | 0 | 420,372 | 1,363,478 |

TABLE II-continued

NET VALUES AFFECTED BY LOAN ACTIVITY

| Age | Annual Outlay | Accum. Loans | Accum. Value | Death Benefit Available |
| --- | --- | --- | --- | --- |
| 57 | 15,200 | 0 | 462,172 | 1,363,478 |
| 58 | 15,200 | 0 | 507,189 | 1,363,478 |
| 59 | 15,200 | 0 | 555,686 | 1,363,478 |
| 60 | 15,200 | 0 | 610,797 | 794,036 |
| 61 | 15,200 | 0 | 669,813 | 857,361 |
| 62 | 15,200 | 0 | 733,009 | 923,591 |
| 63 | 15,200 | 0 | 800,682 | 992,846 |
| 64 | 15,200 | 0 | 873,156 | 1,065,250 |
| 65 | −184,208 | 61,250 | 737,783 | 898,386 |
| 66 | −61,250 | 126,481 | 724,226 | 887,423 |
| 67 | −61,250 | 195,953 | 709,485 | 874,757 |
| 68 | −61,250 | 269,939 | 693,455 | 860,215 |
| 69 | −61,250 | 348,736 | 676,018 | 843,605 |
| 70 | −61,250 | 432,653 | 657,044 | 824,717 |
| 71 | −61,250 | 522,026 | 636,595 | 791,627 |
| 72 | −61,250 | 617,207 | 614,618 | 754,532 |
| 73 | −61,250 | 718,576 | 591,094 | 713,168 |
| 74 | −61,250 | 826,533 | 566,010 | 667,249 |
| 75 | −61,250 | 941,508 | 539,483 | 616,593 |
| 76 | −61,250 | 1,063,956 | 510,573 | 592,757 |
| 77 | −61,250 | 1,194,363 | 478,995 | 566,545 |
| 78 | −61,250 | 1,333,247 | 444,430 | 537,647 |
| 79 | −61,250 | 1,481,158 | 406,510 | 505,707 |
| 80 | −61,250 | 1,638,683 | 364,808 | 470,308 |
| 81 | −61,250 | 1,806,448 | 318,832 | 430,967 |
| 82 | −61,250 | 1,985,117 | 268,016 | 387,125 |
| 83 | −61,250 | 2,175,399 | 211,717 | 338,143 |
| 84 | −61,250 | 2,378,050 | 149,219 | 283,311 |

As shown in Table II, an annual outlay of $184,208 is scheduled during the year of retirement at 65 years of age. This amount represents in this example a loan against the accumulated cash value of the policy to cover $61,250 of income to the now-retired employee, $103,158 principal to retire the loan, and a premium payment of $19,800, causing the cash value of the policy to dip somewhat upon the changeover.

The particular amounts paid in and withdrawn by loans against the cash value of the policy are of course variable, and dependent on economic rates of return as well as the terms of the policy and the loan agreement. It is possible to forecast best case and worst case scenarios for economic return in order to provide a cushion against lean times. In other respects, the plan values are determined from quantitative factors characterizing the employee, such as the age of the employee, the planned retirement age, the planned retirement duration, a minimum number of years for payment of scheduled premiums, a maximum incremental payment, the employee's tax bracket, and health or longevity factors that are factored into the relationship of the insurance premiums to the death benefit/cash value of the policy.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method for computerized administration of leveraged split dollar life insurance coverage, by contributions of an employer and an employee to pay for a loan of insurance premiums, comprising the steps of:

defining at least one available insurance agreement for a life insurance policy to be owned by the employee, by storing data representing terms of the insurance agreement in a memory of a computer, the terms of the insurance agreement including a relationship of premium payments due in order to purchase life insurance over a predetermined term of at least seven years, in a range of values encompassing at least one of a predetermined death benefit range, a predetermined cash value range, and a predetermined premium payment range;

defining at least one available loan agreement to be taken by the employer, by storing data representing terms of the loan agreement in the memory of the computer, including principal and interest payments needed to pay off loans in predetermined principal amounts over said term of years for a principal amount over a loan principal range, the life insurance having a cash value available to pay off the loans and being collaterally assigned to the employer, the terms of the insurance agreement and of the loan agreement forming a set of constants defining insurance policies and loans over ranges of death benefits, cash values, loan principals and terms of years;

for at least one employee, defining at least two quantitative factors chosen from a desired death benefit amount, a desired contribution level of the employer and a desired contribution level of the employee;

processing by computerized data processing means the insurance agreement terms and the loan agreement terms stored in the memory, to equate a sum of the contribution levels of the employer and the employee with a particular loan principal such that said sum of contribution levels is sufficient to offset the principal and interest payments of the loan agreement, while calculating a plurality of incremental employer payments and employee payments over time; and, adjusting by said data processing means the contribution levels of the employer and the employee to determine actual employer payments and employee payments such that:

the actual employee payments include scheduled premiums in a calculated amount payable for at least seven years;

in at least a first three years of the term of years the actual employer payments include employer unscheduled premiums, and over the term of years the actual employer payments include all employer unscheduled premiums plus interest on the loan agreement;

no more than seventy percent of the sum of all scheduled and unscheduled premiums to be paid under the insurance agreement are paid during a first four years of the term of years from said scheduled and unscheduled premiums; and, after seven years of the term of years, the employee may terminate actual payments and use loans on the insurance policy to pay all or part of the scheduled premiums;

whereby, the actual employer and employee payments are sufficient to support a split dollar insurance policy owned by the employee and providing a tax-free death benefit to beneficiaries of the insurance policy equal to a difference between the death benefit and the loans on the insurance policy taken out by the employee.

2. The method for computerized administration of claim 1, further comprising integrating the insurance policy with a retirement program by adjusting the employer and employee contributions such that the loans on the insurance policy are in part used for retirement income to the employee, thereby reducing the difference between the death benefit and the loans on the insurance policy.

3. The method for computerized administration of claim 2, wherein said defining of the at least two quantitative factors includes storing data chosen from the set consisting of an age of the employee, a planned retirement age, a planned retirement duration, a minimum number of years for payment of scheduled premiums, a maximum incremental payment, an employee tax bracket, and at least one health factor affecting statistical longevity.

4. The method for computerized administration of claim 3, further comprising forecasting at least one of a rate of future economic return and future loan interest rates, and calculating from the quantitative factors a schedule of loans against the insurance policy available after the planned retirement age.

5. The method for computerized administration of claim 1, wherein at least part of the employee payments are obtained from bonuses to be paid by the employer.

* * * * *